(12) United States Patent
Law (10) Patent No.: US 8,947,040 B2
(45) Date of Patent: *Feb. 3, 2015

(54) UNIVERSAL CHARGER

(71) Applicant: ADA (Hong Kong) Limited, Hong Kong (HK)

(72) Inventor: Hung Hi Law, Hong Kong (HK)

(73) Assignee: ADA (Hong Kong) Limited, Lai Chi Kok, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,342

(22) Filed: Dec. 12, 2013

(65) Prior Publication Data

US 2014/0097796 A1     Apr. 10, 2014

Related U.S. Application Data

(62) Division of application No. 12/683,430, filed on Jan. 7, 2010, now Pat. No. 8,633,674.

(51) Int. Cl.
*H02J 7/00*         (2006.01)
(52) U.S. Cl.
CPC .............. *H02J 7/0003* (2013.01); *H02J 7/0045* (2013.01); *H02J 2007/0062* (2013.01)
USPC ............................ 320/107; 320/112; 320/114

(58) Field of Classification Search
USPC .................................. 320/107, 110, 112, 114
See application file for complete search history.

(56) References Cited

U.S. PATENT DOCUMENTS

| | | | | |
|---|---|---|---|---|
| 5,686,811 A * | 11/1997 | Bushong et al. | ............... | 320/110 |
| 6,384,575 B1 * | 5/2002 | Chen et al. | .................... | 320/110 |
| 2006/0197497 A1 * | 9/2006 | Wong et al. | .................... | 320/114 |
| 2008/0074077 A1 * | 3/2008 | Wong et al. | .................... | 320/103 |
| 2009/0108802 A1 * | 4/2009 | Wu | ............................... | 320/103 |

* cited by examiner

*Primary Examiner* — Samuel Berhanu
(74) *Attorney, Agent, or Firm* — Tsz Lung Yeung (57) ABSTRACT

A universal charger includes a portable charger housing, an universal charging arrangement, and an energy input device. The universal charging arrangement includes a charging circuitry for managing electricity charging of the rechargeable battery, and a plurality of charging terminals movably provided in the battery compartment of the portable charging housing, wherein the charging terminals are adapted to move in the battery compartment to accurately and adjustably align with the battery terminals of the rechargeable battery. The energy input device is electrically connected with the charging circuitry, which is capable of charging a wide variety of electronic devices by acquiring power through a convention USB port.

13 Claims, 8 Drawing Sheets

UNIVERSAL CHARGER

CROSS REFERENCES TO RELATED APPLICATIONS

This is a divisional application of a non-provisional application having an application Ser. No. 12/683,430 and a filing date of Jan. 7, 2010. This application is incorporated by reference herewith.

BACKGROUND OF THE PRESENT INVENTION

1. Field of Invention

The present invention relates to a charger, and more particularly to a universal charger which is capable of conveniently charging a wide variety of rechargeable batteries through conventional USB ports.

2. Description of Related Arts

A conventional charger usually comprises a charger housing having a battery compartment formed thereon and a power plug extended from the charger housing, and a charging circuitry provided within the charger housing to electrically connect between the power plug and the battery compartment. When a rechargeable battery, such as a cellular phone battery, is placed in the battery compartment, a user can electrically connect the power plug to an external AC power source for charging the rechargeable battery received in the battery compartment.

A main disadvantage of this conventional charger is the need to have an external AC power source for charging the rechargeable battery. Strictly speaking, therefore, the conventional charger is not portable in the sense that the user is usually not able to use it in outdoor environment where an external AC power source is not available. Moreover, the conventional charger is only suitable for one particular type of rechargeable battery. If the user has a number of electronic devices (such as a cellular phone and a camera or a video recorder), he or she has to bring two separate chargers for charging the electronic devices.

In order to resolve this limitation, a number of variations for the above conventional charger have been developed. For example, some chargers have been developed to allow rechargeable batteries to be recharged through USB port. However, those USB chargers have several limitations. First, almost all USB chargers have a rather limited maximum charging capacity, so that they are only capable of charging rechargeable batteries of around 4V capacity. This limitation is due to limited voltage output of a typical USB port of a typical computer. In other words, one may not charge a wide range of rechargeable batteries by a conventional USB ports, because of its inadequate voltage output, and this problem cannot be resolved by buying a new computer, since the power output for a typical USB port of a typical computer is standardized by computers' manufacturers.

SUMMARY OF THE PRESENT INVENTION

A main object of the present invention is to provide a universal charger which is capable of conveniently charging a wide variety of rechargeable batteries through a typical USB port, so that the present invention is adapted to be used in a wide variety of circumstances for charging most rechargeable batteries, i.e. a truly universal charger. In other words, there is virtually no geographical or environmental limitation as to the use of the universal charger of the present invention.

Another object of the present invention is to provide a universal charger which comprises an energy input device which allows the universal charger to selectively acquire electricity source through an external USB port, or an external AC power source.

Another object of the present invention is to provide a universal charger comprising a universal charging arrangement and an energy input device which allow the user to recharge most rechargeable batteries for typical portable electronic devices (such as a cellular phone and a digital camera) without needing to carry many battery chargers for different kinds of portable electronic devices and through a standard USB port in a computer.

Another object of the present invention is to provide a universal charger, wherein the universal charging arrangement allows charging of rechargeable batteries having a relatively high voltage capacity through a conventional USB port. In other words, the present invention overcomes the conventional problems of limited voltage output of a typical USB port without modifying the computer. In other words, the user may use the universal charger of the present invention to charge a wide range of rechargeable batteries by a conventional computer without modifying its electrical output.

Accordingly, in order to accomplish the above objects, the present invention provides a universal charger for a rechargeable battery having a plurality of battery terminals, comprising:

a portable charger housing having a receiving cavity and a battery compartment for fittingly receiving the rechargeable battery;

an universal charging arrangement, which comprises:

a charging circuitry provided within the receiving cavity for managing electricity charging of the rechargeable battery; and a plurality of charging terminals movably provided in the battery compartment of the portable charging housing, wherein the charging terminals are adapted to move in the battery compartment to accurately and adjustably align with the battery terminals of the rechargeable battery; and an energy input device which is electrically connected with the charging circuitry, and comprises a USB plug extended from the portable charger housing to electrically connect with an external USB socket for acquiring electricity from the USB socket to charge the rechargeable battery, whereby a user is able to utilize an external power socket for charging the rechargeable battery having various voltage capacities.

The above mentioned objectives, features, and advantages of the present invention will be more clearly and unambiguously explicated and shown in the following detailed description, drawings, and the claims.

DETAILED DESCRIPTION OF THE PREFERRED EMBODIMENT

Referring to FIG. 1 to FIG. 4, FIG. 5A to FIG. 5D, of the drawings, a universal charger for charging a rechargeable battery 70 according to a preferred embodiment of the present invention is illustrated. The universal charger comprises a portable charger housing 10, a universal charging arrangement 20, and an energy input device 30. The rechargeable battery 70, such as a conventional rechargeable battery for a cellular phone or a camcorder, has a plurality of battery terminals 71 spacedly provided thereon. Note also that the rechargeable battery 70 can be a Li-ion rechargeable battery 70 or a Ni-MH AA/AAA rechargeable battery 70.

The portable charger housing 10 has a receiving cavity 11 and a battery compartment 12 for fittingly receiving the rechargeable battery 70 within the battery compartment 12.

The universal charging arrangement 20 comprises a charging circuitry 21 and a plurality of charging terminals 22, wherein the charging circuitry 21 is provided within the receiving cavity 11 for managing electricity charging of the rechargeable battery 70. On the other hand, the charging terminals 22 are movably provided in the battery compartment 12 of the portable charger housing 10, in which the charging terminals 22 are adapted to adjustably move in the battery compartment 12 to accurately align with the battery terminals 71 of the rechargeable battery 70 when the rechargeable battery 70 is disposed into the battery compartment 12.

The energy input device 30 is electrically connected with the charging circuitry 21, and comprises a USB plug 31 extended from the portable charger housing 10 to electrically connect with an external USB socket (of a computer) for acquiring electricity from the USB socket to charge the rechargeable battery 70, so that a user is able to utilize an external USB socket for conveniently charging the rechargeable battery 70 having various capacities.

According to the preferred embodiment of the present invention, the portable charger housing 10 has a supporting base 13 and a cover member 14 movably provided on top of the supporting base 13 to define the battery compartment 12 of the portable charger housing 10, wherein the rechargeable battery 70 is adapted to be fittedly disposed into the battery compartment 12 for recharging thereof. In other words, the cover member 14 is adapted to displace on the supporting base 13 to adjust a size of the battery compartment 12 such that the rechargeable battery 70 is capable of being fittingly disposed into the battery compartment 12. Thus, the size of the battery compartment 12 is optimally adjustable for fitting rechargeable batteries 70 of varying sizes.

The energy input device 30 further comprises a USB cord 32 flexibly connecting between the portable charger housing 10 and the USB plug 31 so as to extend the USB plug 31 to an external USB socket, such as a USB socket in a desktop computer. It is worth mentioning that the USB cord 32 can be attached onto the portable charger housing 10 or it can be detachable from the portable charger housing 10 so as to reduce the universal charger into a compact portable accessory.

It is worth mentioning that the charging circuitry 21 is arranged to raise the voltage of a typical USB electrical supply voltage of approximately 4.2V to approximately 5.5V for charging the rechargeable battery 70 having such a high capacity. For a conventional USB port, the output voltage is typically approximately 4.2V, thereby merely capable of charging a lithium battery pack having two rechargeable lithium batteries of 4.2V each (i.e. 8.4V for the entire battery pack). For the present invention, however, the adjustable charger of the present invention is capable of recharging not only cellular phone batteries, but also batteries for camcorders, digital cameras and the likes having a charging voltage of up to 11V (for a battery pack having two lithium battery of 5.5V each). In short, the adjustable charger of the present invention can be utilized for charging rechargeable lithium-ion batteries 70 of most, if not virtually all, foreseeable portable electronic devices which one uses in an outdoor environment for self-enjoyment.

Referring to FIG. 5A to FIG. 5D of the drawings, the charging circuitry 21 comprises a charging module 211 which contains a battery charging module 2111 adapted for charging at least one Li-ion battery and/or at least one Ni-MH battery, a detection module 2112, a charger control module 2113 for controlling the main charging process of the universal charger, and a display module 2114. Note that the battery charging module 2111, the detection module 2112, the charger control module 2113, and the display module 2114 are incorporated into one single circuit board forming the charging circuitry 21 which has the charging module 211. However, they can also be provided in the portable charger housing 10 separately, which further comprises a display 15 for displaying a charging status of the rechargeable battery 70 as controlled by the display module 2114.

Figure 5A:
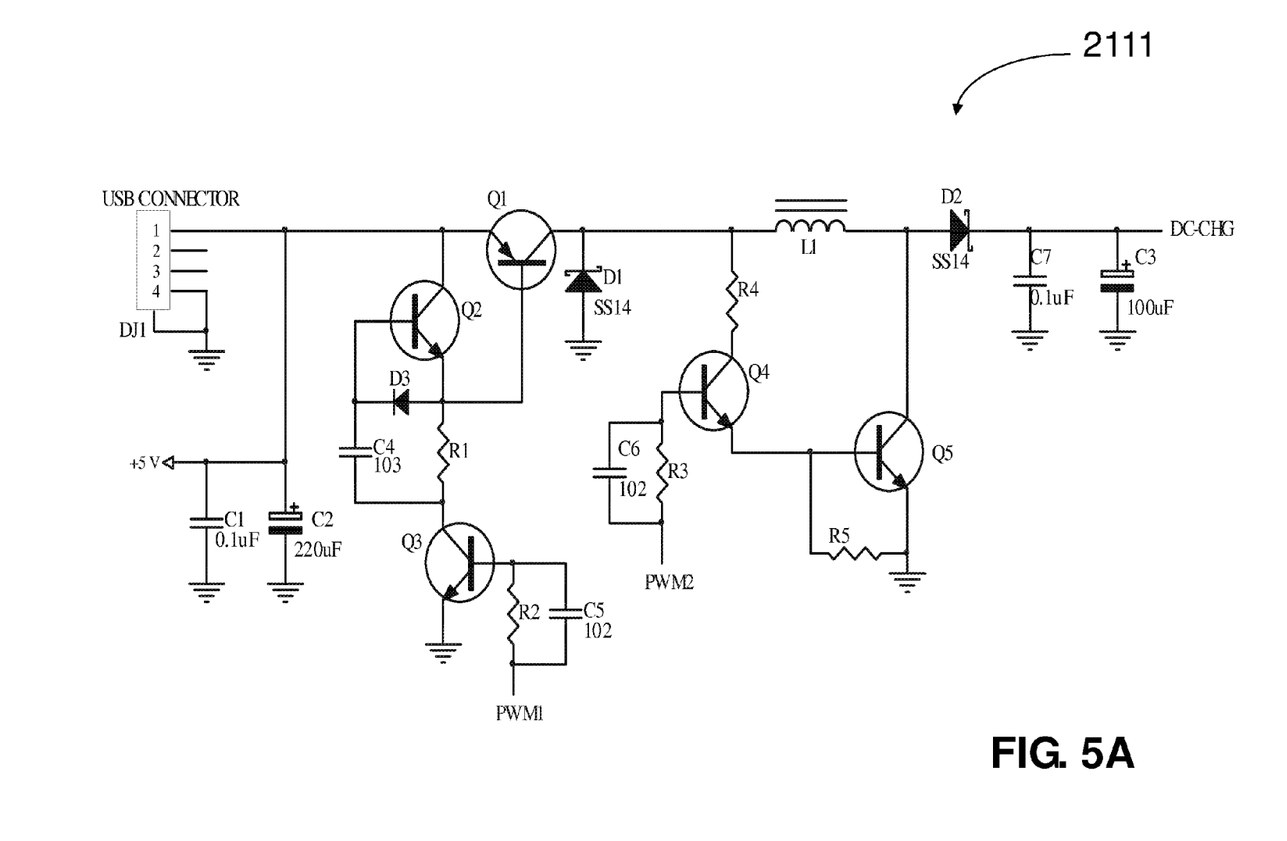
FIG. 5A to FIG. 5D are circuit diagrams of the universal charger according to the preferred embodiment of the present invention.
Figure 5B:
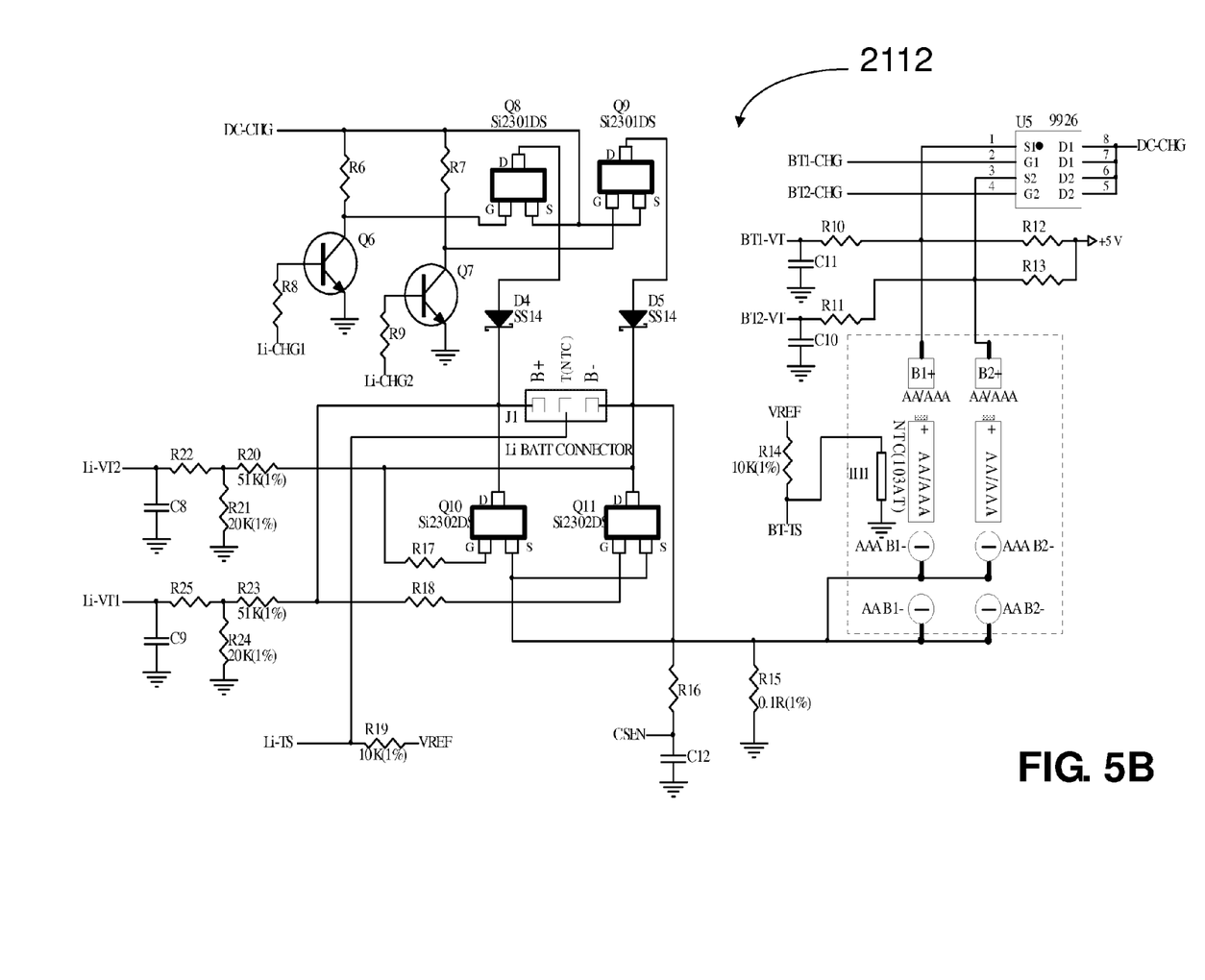
Figure 5C:
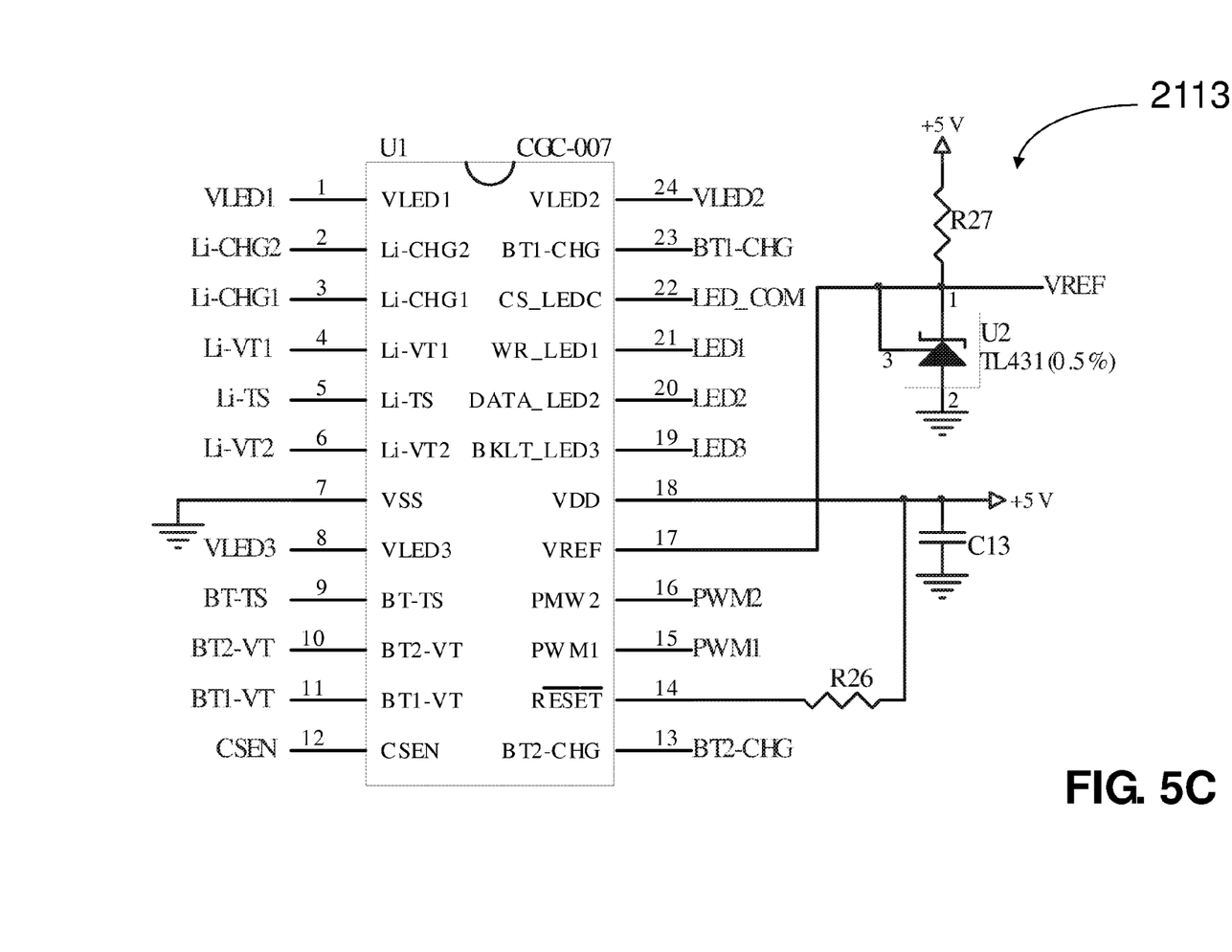
Figure 5D:
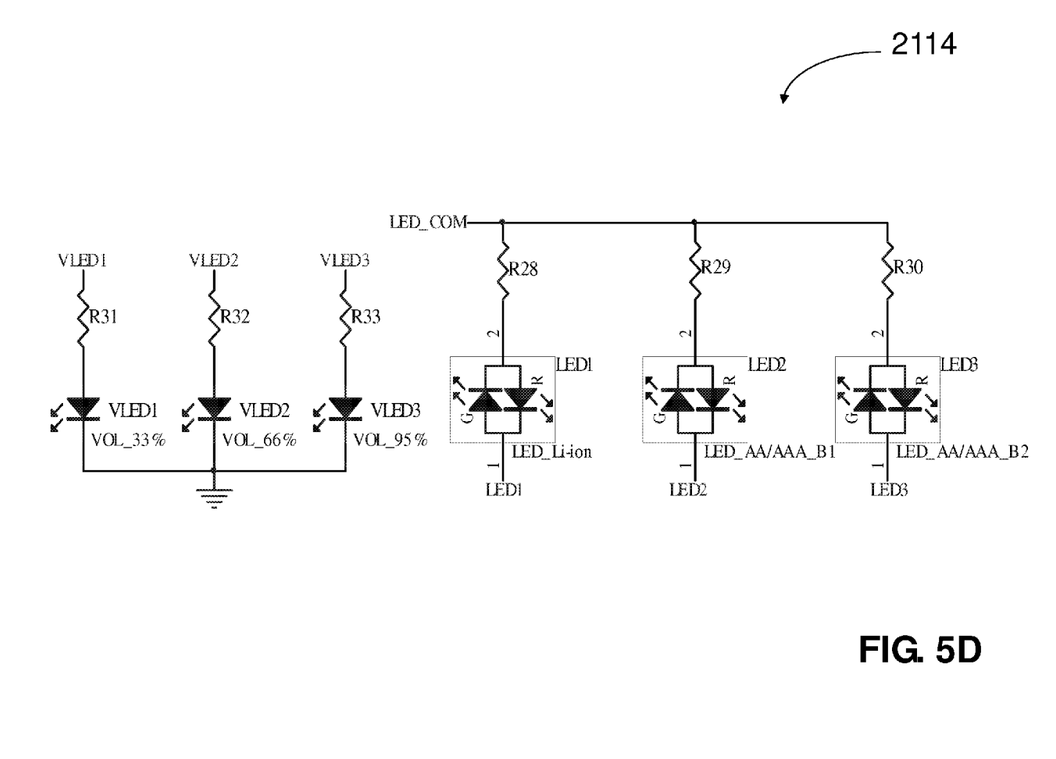

As shown in FIG. 5A of the drawings, the battery charging module 2111 is arranged to utilize Pulse Width Modulation (PWM) control of battery charging for adjusting and controlling battery voltage and accomplishing current control. The battery charging module 2111 has a step-down converter (for 3.6V Li-ion and AA/AAA battery charging) and step-up converter (for 7.2V Li-ion battery charging). As shown in FIG. 5B of the drawings, the detection module 2112 is arranged to detect a positive and negative nature of the rechargeable Li-ion battery 70, the voltage, the current and the temperature of the rechargeable battery 70 which is being charged, and control the one/off status of the battery charging module 2111. As shown in FIG. 5C of the drawings, the charger control module 2113 comprises a Main controller (MCU) of the universal charger which controls and operates all functions, and other modules and determines the charging reference voltage of the universal charger. As shown in FIG. 5D of the drawings, the display module 2114 is arranged to control the operation of the display 15 in responsive to the charging status of the rechargeable battery 70. The display module 2114 is embodied as a LED display circuit, wherein the display of the Li-ion rechargeable battery 70 is by one dual-color LED and three green LED, and the display of two AA/AAA rechargeable batteries 70 is by using two dual-color LED (Red-Green).

The universal charging arrangement 20 further comprises a terminal matching device which contains a guiding slot 23 longitudinally formed in the battery compartment 12 of the portable charger housing 10, wherein the charging terminals 22 are adapted to adjustably slide along the guiding slot 23 for aligning with the battery terminals 71 respectively. A user is then able to slidably move the charging terminals 22 along the guiding slot 23 for aligning the battery terminals 71 with the charging terminals 22 respectively. The terminal matching device 23 further comprises a plurality of terminal holders 24 slidably mounted at the guiding slot 23, wherein the charging terminals 22 are affixed at the terminal holders 24 so as to be slidably mounted at the guiding slot 23.

Figure 1:
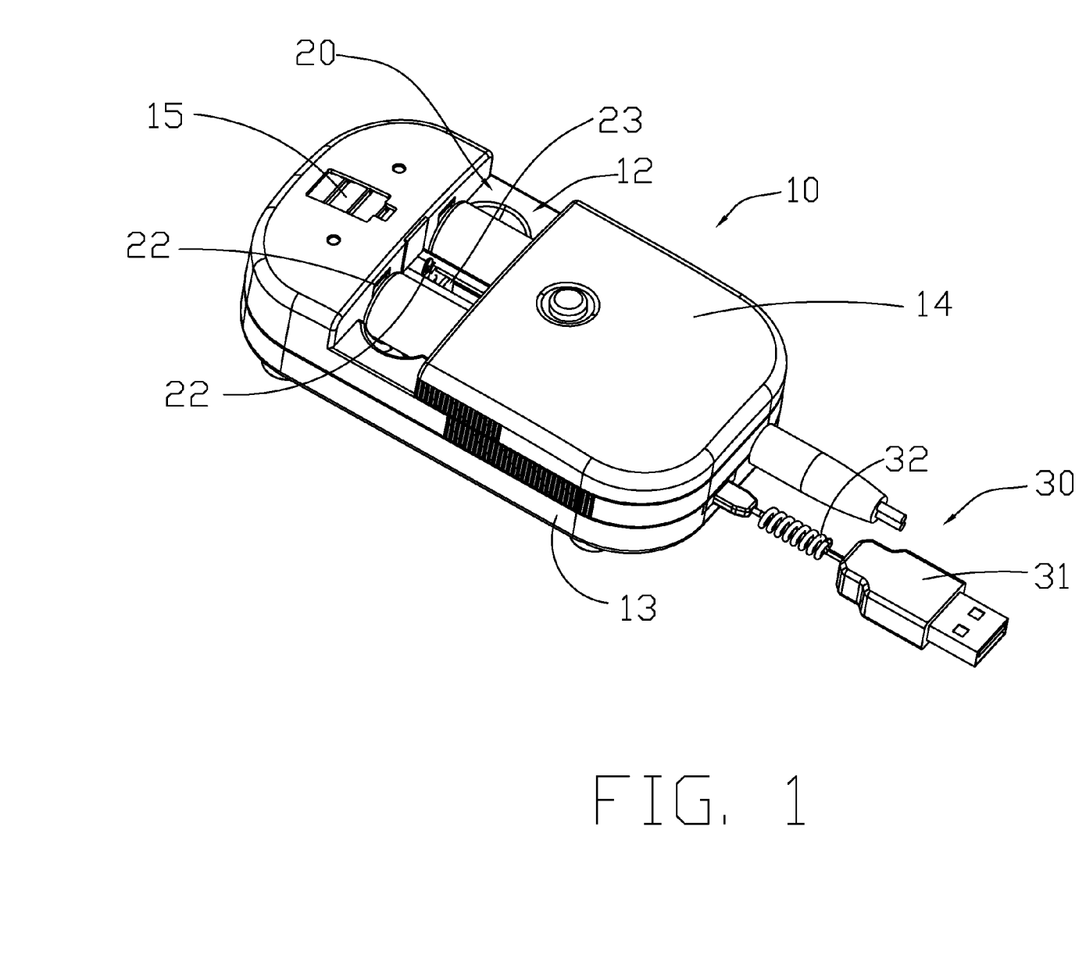
FIG. 1 is a perspective view of a universal charger according to a preferred embodiment of the present invention.
Figure 2:
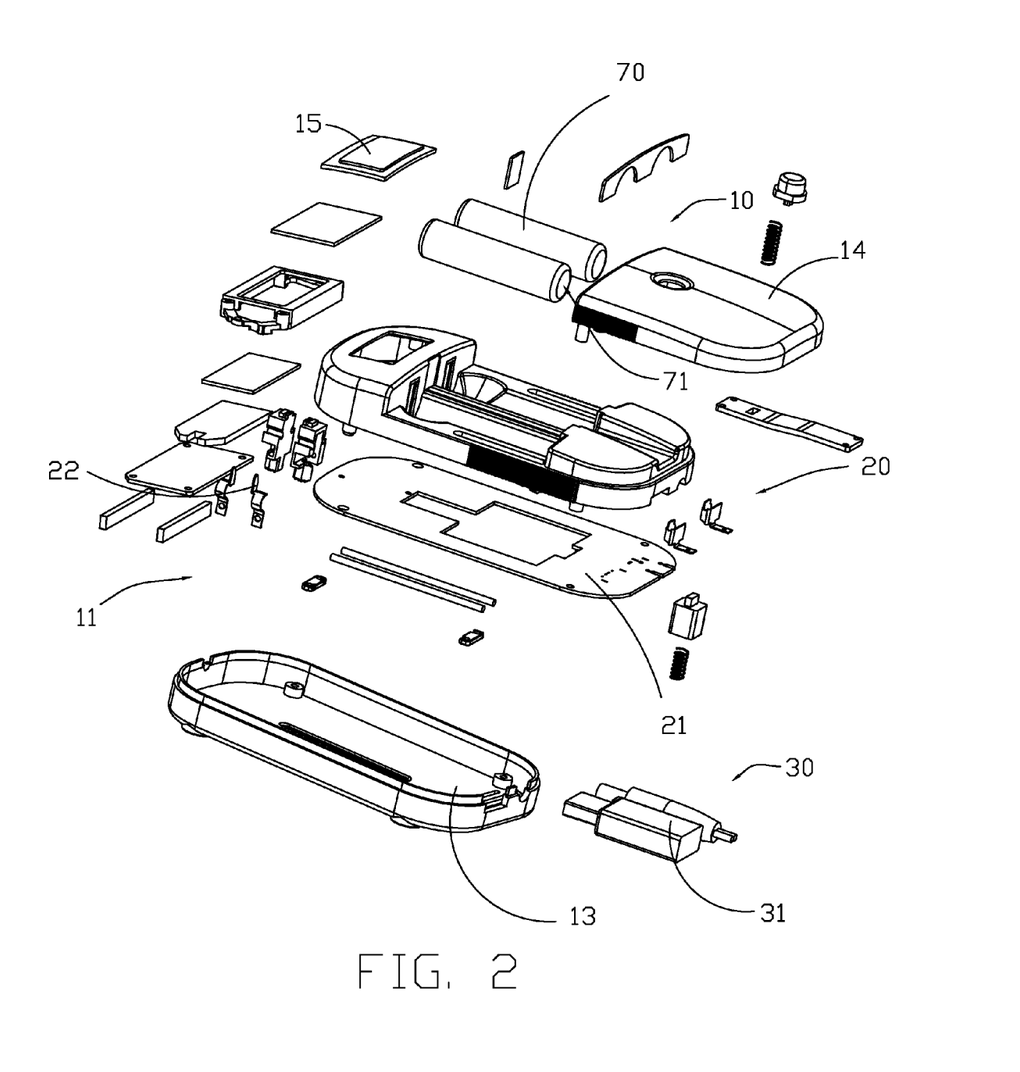
FIG. 2 is an exploded perspective view of the universal charger according to the preferred embodiment of the present invention.
Figure 3:
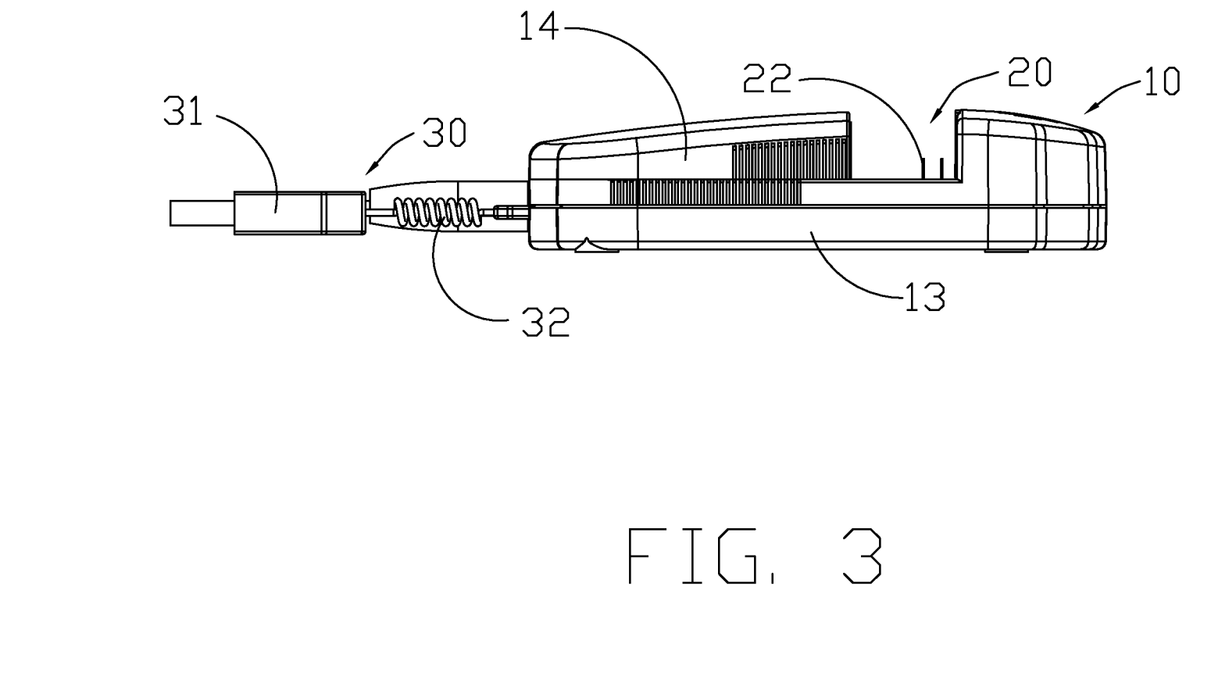
FIG. 3 is a side view of the universal charger according to the preferred embodiment of the present invention.
Figure 4:
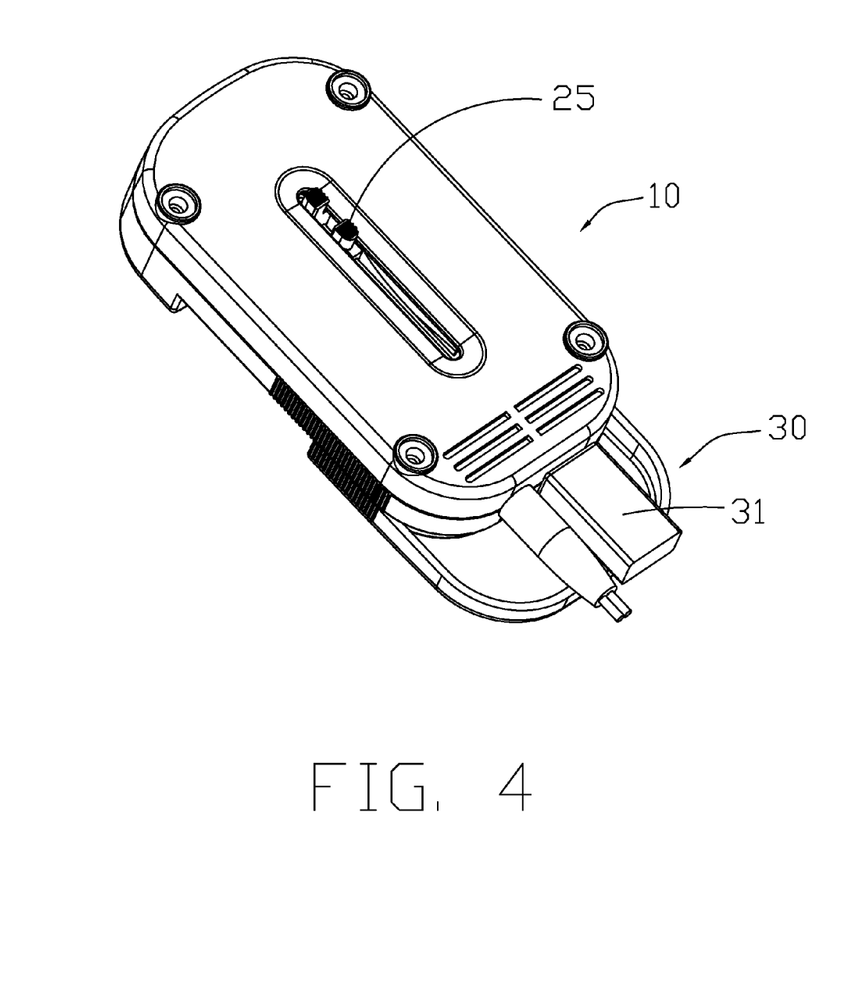
FIG. 4 is a perspective view of a universal charger according to a preferred embodiment of the present invention, illustrating a bottom side of the universal charger.

According to the preferred embodiment of the present invention, the terminal matching device 23 further comprises a plurality of adjustment guider 25 extended from the terminal holders 24 respectively to expose to an exterior of the charger housing 10 through a bottom surface thereof, wherein a user is able to conveniently move the terminal matching device 23 to slide along the guiding slot 23 by manually moving the adjustment guider 25 along the through guiding slot 23 as formed at the bottom surface of the charger housing 10, as shown in FIG. 4 of the drawings.

When the rechargeable battery 70 is disposed into the battery compartment 12, the charging circuitry 21 will check for battery temperature as well as the working conditions of the universal charger. For example, the charging circuitry 21 will check for battery capacity and stops charging the rechargeable battery 70 when it is full in electricity capacity.

It is worth mentioning that the user is able to selectively utilize the energy input device 30 as an energy source for charging the rechargeable battery 70. For example, the user may extend the USB plug 31 to an external USB socket on his laptop computer for acquiring electricity.

As such, a user is able to conveniently carry the universal charger of the present invention to a wide range of outdoor activities without worrying absence of conventional power source. Moreover, since the universal charger of the present invention is capable of charging rechargeable batteries 70 of various kinds, the user is able to charge rechargeable battery 70 for most of his or her portable electronic devices by one single universal charger which is conveniently and easily portable.

One skilled in the art will appreciate that the embodiment of the present invention as shown in the drawings and described above is illustrative only and not intended to be limiting. All embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A universal charger for at least one rechargeable battery having a plurality of battery terminals, comprising:

a portable charger housing having a receiving cavity and a battery compartment for fittingly receiving said rechargeable battery;

an universal charging arrangement, which comprises:

a charging circuitry which comprises:

a charger control module comprising a main controller and being adapted to detect a charging voltage of said rechargeable battery and determine a reference charging voltage corresponding to said charging voltage of said rechargeable battery without manual selection; and a battery charging module electrically connecting to said charger control module, and is adapted to directly acquire electricity from a USB electrical supply having an approximately 5V voltage output, said battery charging module being arranged to output a voltage in a continuous range between approximately 3.6V and approximately 8.4V to optimally recharge said rechargeable battery having a charging voltage detected by said charger control module and in a range between approximately 3.6V and approximately 8.4V, wherein said battery charging module does not electrically connect to an AC power source, said battery charging module being arranged to utilize Pulse Width Modulation (PWM) control of battery charging for adjusting and controlling battery voltage and current control, and having a step-down converter for charging said rechargeable battery having a voltage lower than that of said USB output voltage, and a step-up converter for charging said rechargeable battery having a voltage higher than that of said USB output voltage, said battery charging module being electrically connected to said main controller which is arranged to manage a charging process of said battery charging module;

a plurality of charging terminals movably provided in said battery compartment of said portable charging housing, wherein said charging terminals are adapted to move in said battery compartment to accurately and adjustably align with said battery terminals of said rechargeable battery; and an energy input device which is electrically connected with said charging circuitry, and comprises a USB plug extended from said portable charger housing to electrically connect with an external USB socket for acquiring electricity from said USB socket to charge said rechargeable battery, whereby a user is able to utilize an external USB socket of a computer for conveniently charging said rechargeable battery having a voltage of approximately 3.6V to 8.4V.

2. The universal charger, as recited in claim 1, wherein said portable charger housing has a supporting base and comprises a cover member movably provided on top of said supporting base to define said battery compartment of said portable charger housing, wherein said rechargeable battery is adapted to be fittedly disposed into said battery compartment for recharging thereof, wherein said cover member is adapted to displace on said supporting base to adjust a size of said battery compartment such that said rechargeable battery of varying sizes is capable of being fittingly disposed into said battery compartment.

3. The universal charger, as recited in claim 1, wherein said battery charging module of said charging circuitry is adapted for simultaneously and selectively charging at least one of Li-ion battery and one Ni-MH battery.

4. The universal charger, as recited in claim 2, wherein said battery charging module of said charging circuitry is adapted for simultaneously and selectively charging at least one of Li-ion battery and one Ni-MH battery.

5. The universal charger, as recited in claim 1, wherein said energy input device further comprises a USB cord flexibly connecting between said portable charger housing and said USB plug so as to extend said USB plug to an external USB socket, and a retraction device provided on said portable charger housing to connect with said USB cord in such a manner that said retraction device is adapted to retractably extend said USB cord away from said portable charger housing, wherein said portable charger housing further has a storage compartment provided thereon to normally receive said USB plug therewithin wherein a user is able to access said storage compartment for extending said USB plug to connect with said external USB socket.

6. The universal charger, as recited in claim 2, wherein said energy input device further comprises a USB cord flexibly connecting between said portable charger housing and said USB plug so as to extend said USB plug to an external USB socket, and a retraction device provided on said portable charger housing to connect with said USB cord in such a manner that said retraction device is adapted to retractably extend said USB cord away from said portable charger housing, wherein said portable charger housing further has a storage compartment provided thereon to normally receive said USB plug therewithin wherein a user is able to access said storage compartment for extending said USB plug to connect with said external USB socket.

7. The universal charger, as recited in claim 4, wherein said energy input device further comprises a USB cord flexibly connecting between said portable charger housing and said USB plug so as to extend said USB plug to an external USB socket, and a retraction device provided on said portable charger housing to connect with said USB cord in such a manner that said retraction device is adapted to retractably extend said USB cord away from said portable charger housing, wherein said portable charger housing further has a storage compartment provided thereon to normally receive said USB plug therewithin wherein a user is able to access said storage compartment for extending said USB plug to connect with said external USB socket.

8. The universal charger, as recited in claim 1, further comprising a terminal matching device which contains a guiding slot longitudinally formed in said battery compartment of said portable charger housing in which said charging terminals are adapted to adjustably slide along said guiding slot for aligning with said battery terminals of said rechargeable battery respectively.

9. The universal charger, as recited in claim 2, further comprising a terminal matching device which contains a guiding slot longitudinally formed in said battery compartment of said portable charger housing in which said charging terminals are adapted to adjustably slide along said guiding slot for aligning with said battery terminals of said rechargeable battery respectively.

10. The universal charger, as recited in claim 7, further comprising a terminal matching device which contains a guiding slot longitudinally formed in said battery compartment of said portable charger housing in which said charging terminals are adapted to adjustably slide along said guiding slot for aligning with said battery terminals of said rechargeable battery respectively.

11. The universal charger, as recited in claim 3, wherein said battery charging module, said detection module, said charger control module, and said display module are incorporated into one single circuit board forming said charging circuitry.

12. The universal charger, as recited in claim 4, wherein said battery charging module, said detection module, said charger control module, and said display module are incorporated into one single circuit board forming said charging circuitry.

13. The universal charger, as recited in claim 10, wherein said battery charging module, said detection module, said charger control module, and said display module are incorporated into one single circuit board forming said charging circuitry.

* * * * *